(12) United States Patent
De Filippo (10) Patent No.: US 6,270,161 B1
(45) Date of Patent: Aug. 7, 2001

(54) HEADREST FOR MOTOR-VEHICLE SEATS

(75) Inventor: Emilio De Filippo, Bruzolo (IT)

(73) Assignee: Gestind M.B. Manifattura Di Bruzolo S.p.A., Bruzolo (IT)

( * ) Notice: Subject to any disclaimer, the term of this patent is extended or adjusted under 35 U.S.C. 154(b) by 0 days.

(21) Appl. No.: 09/349,096

(22) Filed: Jul. 8, 1999

(30) Foreign Application Priority Data

Jul. 9, 1998 (EP) .................................................. 98830416

(51) Int. Cl.[7] ........................................................ A47C 7/38
(52) U.S. Cl. ........................................... 297/410; 297/391
(58) Field of Search .................................... 297/391, 410

(56) References Cited

U.S. PATENT DOCUMENTS

| | | |
|---|---|---|
| 3,055,707 | 9/1962 | Spound . |
| 4,304,439 | 12/1981 | Terada et al. . |
| 4,640,549 | 2/1987 | Yokota . |
| 4,733,913 | 3/1988 | Tateyama . |
| 4,840,429 | * 6/1989 | Stockl ................................... 297/391 |
| 5,052,754 | * 10/1991 | Chinomi .............................. 297/410 |
| 6,082,817 | * 7/2000 | Muller .............................. 297/391 X |

FOREIGN PATENT DOCUMENTS

| | | |
|---|---|---|
| 24 02 498 | 7/1975 | (DE) . |
| 2402498 | * 7/1975 | (DE) ................................... 297/410 |

* cited by examiner

Primary Examiner—Anthony D. Barfield
(74) Attorney, Agent, or Firm—Shlesinger, Arkwright & Garvey LLP

(57) ABSTRACT

A headrest for motor-vehicle seats comprising a yielding body connected to a pair of supports, to be fixed to the backrest of a motor-vehicle seat, through an articulated parallelogram system formed by two pairs of swinging arms by means of which the yielding body can be displaced between a lowered position and a raised position. To hold the yielding body in the raised position or, respectively, in the lowered position a locking system is provided which, in the raised position of the yielding body, applies a retaining force appreciably higher than in the lowered position of the yielding body and can be released by a push-button arranged on one side of the yielding body.

24 Claims, 7 Drawing Sheets

Fig_3

Fig_4

Fig_6

Fig_7

Fig_8

Fig_9

HEADREST FOR MOTOR-VEHICLE SEATS

The present invention is related to headrests for motor-vehicle seats, of the type comprising a yielding body and a support structure for connecting the yielding body to the backrest of a motor-vehicle seat.

BACKGROUND OF THE INVENTION

Traditionally, in the known headrests of the above-referenced type the support structure comprises a pair of parallel rods projecting from the base of the yielding body to be connected to the structure of a seat backrest. Superiorly the two support rods are connected to a load-bearing framework incorporated within the headrest yielding body, and adjustment means are normally provided for the height adjustment of the yielding body relative to the seat backrest. These adjustment means are usually arranged according to two alternative systems: in a first system the support rods are rigidly fixed to the load-bearing framework of the yielding body, and are lowerly connected to the backrest structure in a vertically slidable way, with the aid of resilient positioning members releasably co-operating with corresponding notches formed in the lower portions of the support rods. In the second system the two support rods are rigidly secured to the backrest structure, and are slidably coupled superiorly to the load-bearing framework of the yielding body. Even in this case resilient positioning members are provided, releasably co-operating with notches formed in the upper portions of the support rods to retain the headrest yielding body in the selected position.

These traditional headrests are affected by several drawbacks. Firstly, the slidable connection between the two support rods and the backrest structure or, respectively, the load-bearing framework incorporated within the headrest yielding body may be subjected in use to slacks originating vibrations and noise. Moreover this slidable connection between the support rods and the yielding body, or respectively, the seat backrest may involve undesired upward or downward displacement of the headrest and also, in case of abrupt crash of the vehicle on which the headrest in installed, accidental withdrawal of the support rods and separation of the yielding body from the seat backrest. In such event the headrest function would fail, with adverse consequences for the user.

SUMMARY OF THE INVENTION

The object of the present invention is to overcome the above drawbacks.

According to the invention this object is achieved by the fact that a headrest for motor-vehicle seat of the type set forth at the beginning is characterised in that said support structure comprises an articulated parallelogram system formed by two pairs of swinging arms by means of which said yielding body can be displaced between a lower position and a raised position, and releasable locking means to hold said yielding body in said raised or, respectively, in said lowered position, said locking means providing in said raised position a retaining force appreciably higher than in said lowered position of the yielding body.

According to a preferred embodiment of the invention said locking means act on one of said pairs of swinging arms (normally the lower swinging arm pair) and the other of said pairs of swinging arms (normally the upper swinging arm pair) defines a toggle mechanism whose dead centre is got through in said raised position.

According to the preferred embodiment of the invention said locking means conveniently comprise:

a slider member displaceable transversely of said swinging arms between an inoperative condition and a operative condition, a pair of juxtaposed locking blocks movable parallely to said slider member between a mutually distal position and a mutually proximal position in which said locking blocks interact and, respectively, do not interact with said one pair of swinging arms, resilient thrust means urging said locking blocks towards said distal position, a stop element movable perpendicularly to said slider member and to said locking locks and displaceable, following displacement of said slider member from said inoperative condition to said operative condition, from an advanced position in which said stop element is interposed between said locking blocks to irreversibly keep them in said distal position, and a retracted position in which said locking blocks can be brought near to each other, upon oscillation of said one pair of swinging arms, towards said proximal position against the action of said resilient means.

To displace the slider member from the inoperative condition to the operative condition a push-button is conveniently provided, which is arranged on one side of said yielding body of the headrest.

Moreover, according to another advantageous feature of the invention, the articulated parallelogram system together with the related locking means is carried by a attachment plate designed to be connected to the load-bearing framework of the yielding body of the headrest, following upholstery trimming thereof, by means of irreversible snap-fit coupling means.

Due to the features set forth in the above, and to additional features which will become apparent in the following, the height adjustment of the yielding body of the headrest according to the invention only provides positioning the yielding body in one or in the other of said lowered and raised positions. The lowered position is corresponding to a non-operative condition of the headrest, in which upward projection and thus height encumbrance thereof is minimum so as to ensure, with particular reference to the rear seats of a motor-vehicle, maximum rearward visibility for the driver. As a matter of fact, the headrest according to the invention is particularly—though not exclusively—intended for application as a central rear headrest.

BRIEF DESCRIPTION OF THE DRAWINGS

The invention will now be disclosed in details with reference to the accompanying drawings, purely provided by way of non limiting example, in which.

DETAILED DESCRIPTION OF THE INVENTION

The headrest according to the invention, generally designated as 1, essentially comprises a yielding body 2, normally made of a foamed plastic material and trimmed, i.e. covered by a fabric or the like upholstery sheet 3, and having a general shape complementary to that of the top of the backrest S of a motor-vehicle seat on which the headrest 1 is installed.

Figure 1:
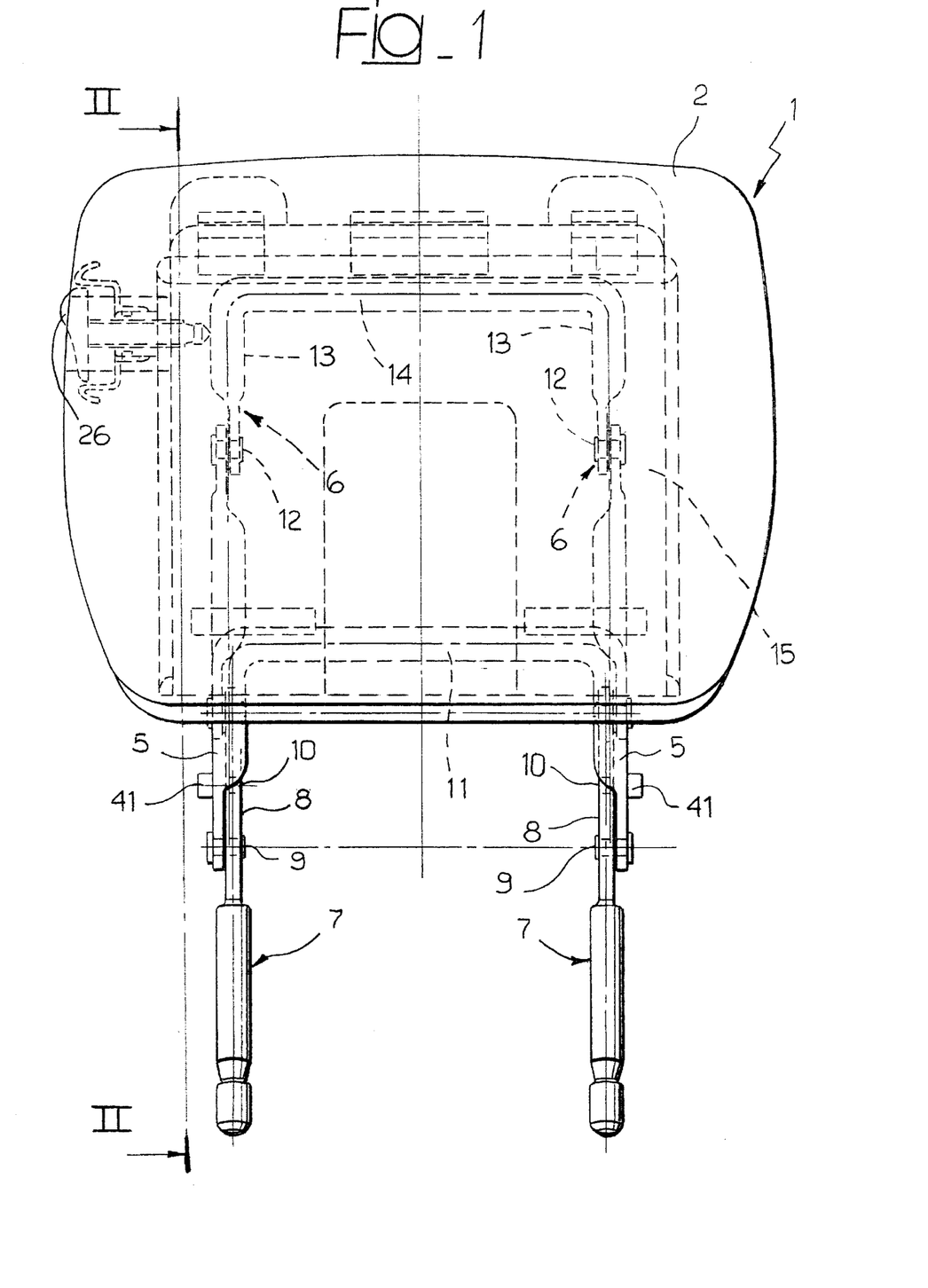
FIG. 1 is a diagrammatic front elevational view of a headrest for motor-vehicle seats according to the invention, shown in a raised position.
Figure 2:
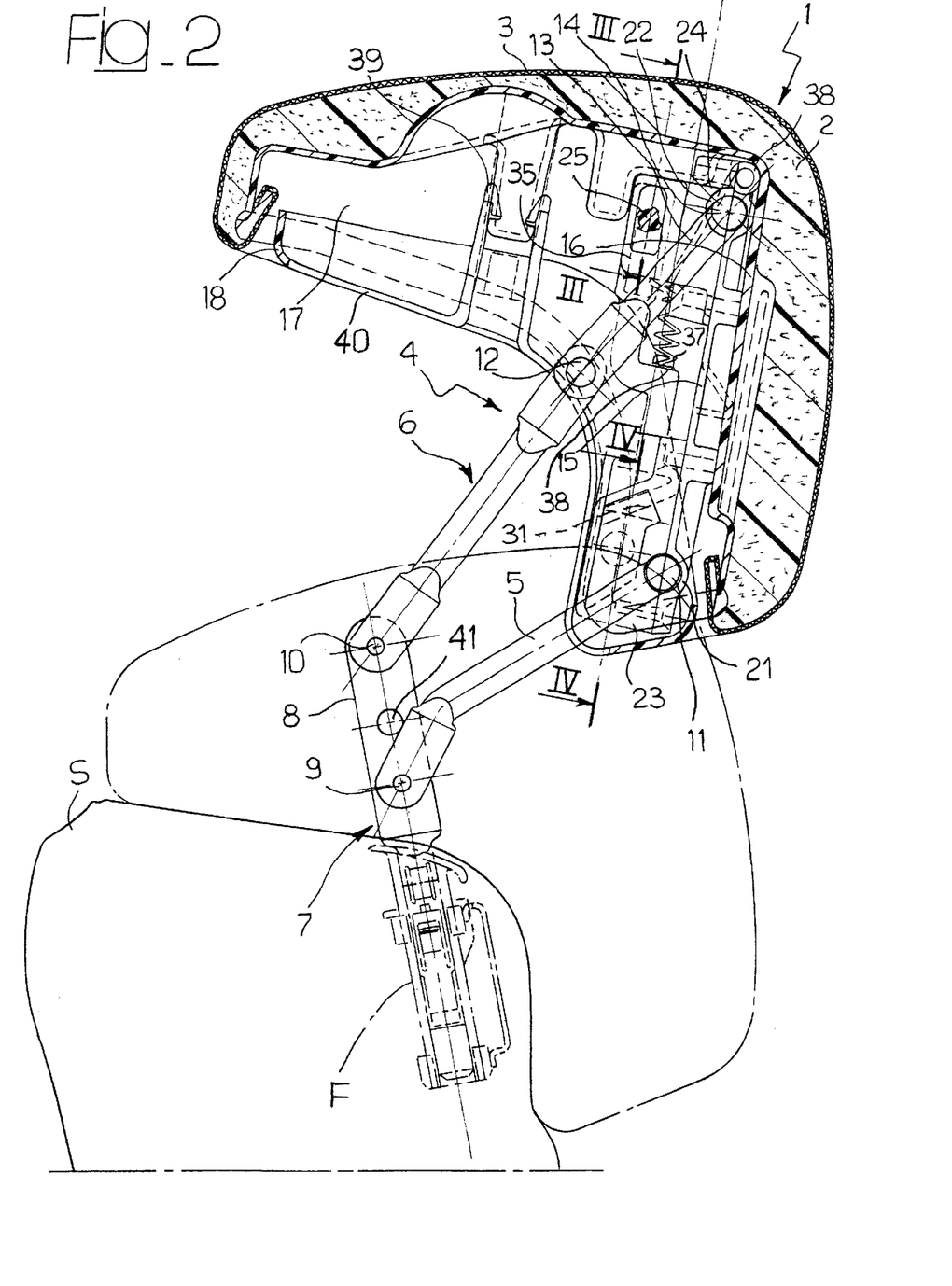
FIG. 2 is a partially vertically sectioned view along line II—II of FIG. 1.

Connection of the body 2 to the seat backrest S is carried out by means of a novel and unique structure, generally designated as 4, by which the body 2 can be oscillated between a lowered position, shown by dotted lines in FIGS. 2 and in FIGS. 5 through 9, in which it rests upon the top of the backrest S, and a raised position in which the body 2 is placed above the top of the backrest S, such as depicted in FIGS. 1 through 4. Due to the peculiar arrangement of the support structure 4, which will be disclosed in more detail herebelow, when the headrest 1 is placed in its lowered position the yielding body 2 is held in a slightly retracted and slightly rearwardly rotated position, while when the headrest 1 is arranged in its raised position the body 2 is slightly advanced and slightly tilted forwardly.

In detail, the support structure 4 comprises an articulated parallelogram system formed by a pair of lower swinging arms 5 and by a pair of upper swinging arms 6 which pivotally interconnect the body 2 and a pair of respective supports 7 rigidly fixed to the structure F of the backrest S in a generally conventional way, so as to partially project above the top of the backrest S. Each support 7 comprises a respective upper plate 8 carrying a pair of pivot pins 9,10 for pivotal connection of a corresponding lower arm 5 and of a corresponding upper arm 6, respectively. The upper plate 8 is further provided with a stop projection 41 whose function is to prevent further upward oscillation of the respective lower arm 5 in the raised position of the body 2 of the headrest 1. The ends of the lower arms 5 opposite to the pivot pins 9 are connected to each other by a yoke 11 acting as a pivoting pin between these lower arms 5 and an attachment structure connected to the yielding body 2, which shall be disclosed in detail further on.

The ends of the upper arms 6 opposite to the respective pivot pins 10 are instead pivotally connected, through respective pins 12 parallel to the pins 10, to a pair of secondary arms 13 which in turn are connected by yoke 14 parallel to the yoke 11 and acting as a pivot pin relative to the attachment structure connected to the body 2.

The assembly formed by the upper arms 6, the secondary arms 13 and the related pivots 10,12 and yoke 14 constitutes a toggle mechanism whose dead center is gone through in the raised position of the headrest 1: actually, as illustrated in FIG. 2, when the body 2 is placed in the raised position the upper arms 6 and the secondary arms 13 are not mutually aligned but are instead axially offset relative to each other by an angle in the range of few degrees.

The attachment structure between the articulated parallelogram system 4 and the body 2 of the headrest 1 comprises a mounting plate 15 connected, such as clarified herebelow, to a rigid half-shell 16 fixed to the body 2 in correspondence of a rear recess 17 thereof and defining a load-bearing framework of this body 2. The mounting plate 15 and the half-shell framework 16 are both normally made of molded plastic material, same as a cover 18 closing the recess 17 and connected to the half-shell 16 for instance such as depicted in FIG. 2, namely by means of snap-fit connecting members 39. The cover 18 is formed with slots 40 passed through by the swinging arms 5,6.

Figure 9:
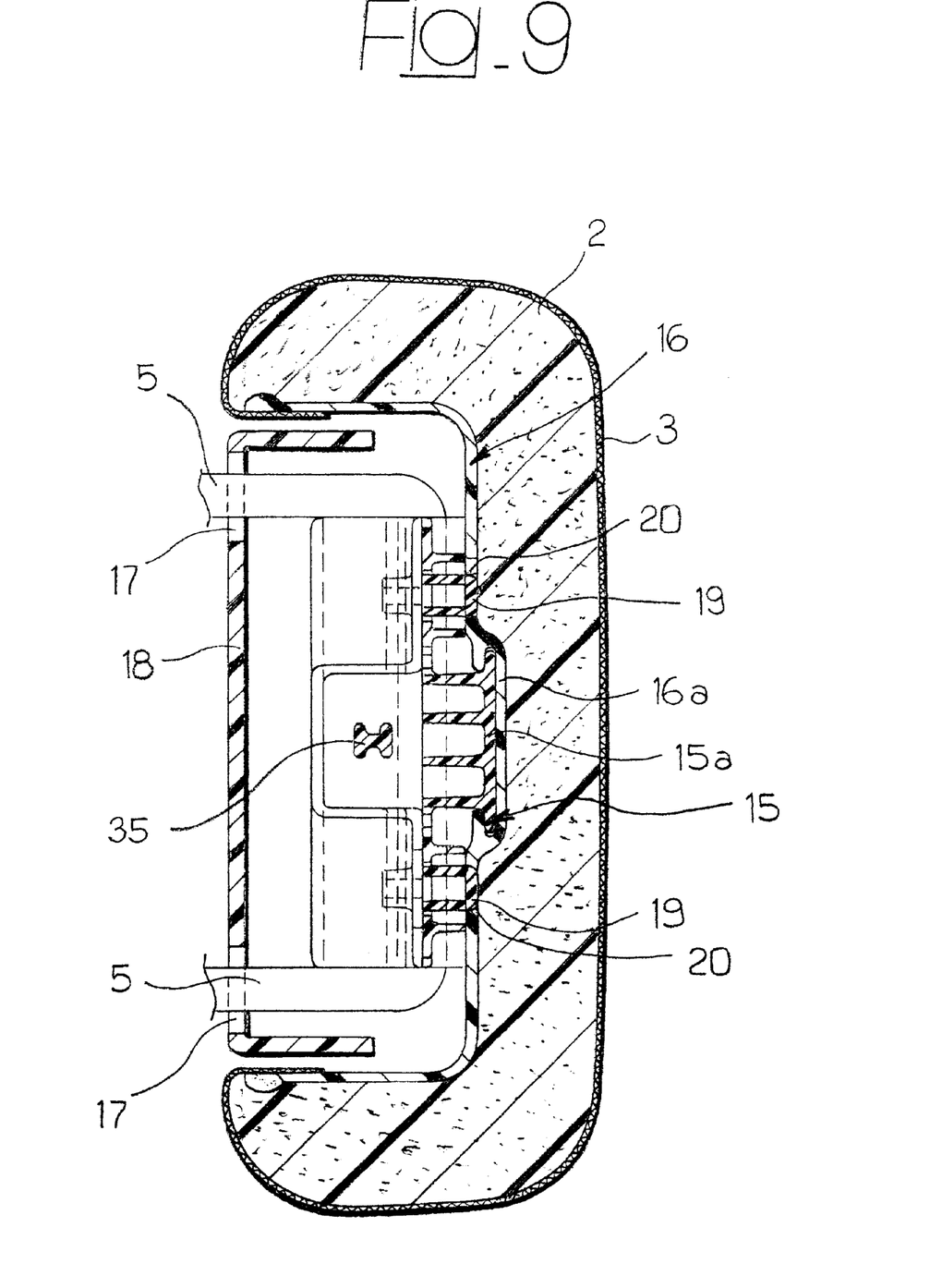
FIG. 9 is a simplified horizontally sectioned view along line IX—IX of FIG. 6.

Connection between the mounting plate 15 and the half-shell 16 is performed such as shown in detail in FIG. 9, to the aim of enabling assembling of the headrest 1 following upholstery trimming on the yielding body 2 on one hand, and fitting of the articulated parallelogram system 4 and related locking mechanism onto the mounting plate 15 on the other hand. To such effect the mounting plate 15 and the half-shell 16 are formed with respective central box coupling portions 15a,16a designed to mutually engage each other through the recess 17, and with irreversible snap-fit locking members consisting of resilient teeth 19 of the mounting plate 15 engaged within corresponding seats 20 of the half-shell 16.

The yokes 11 and 14 are rotatably supported by respective half-bushes 21,22 of the mounting plate 15, which are completed and closed at the back by the wall of a lower tubular element 23 and by the wall of an upper tubular element 24, respectively, in turn fixed to the mounting plate 15 for instance by means of screws.

Figure 3:
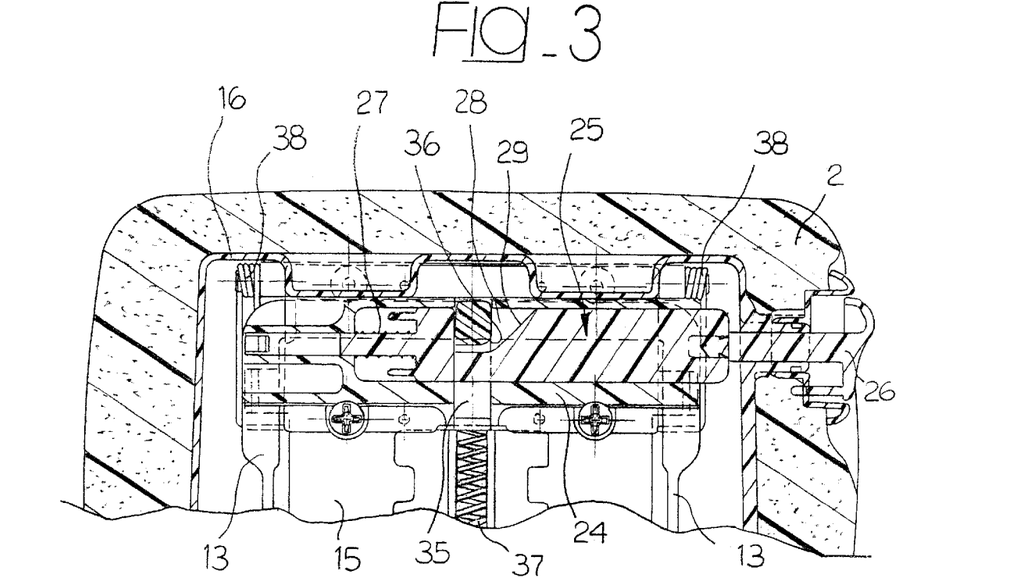
FIG. 3 is a sectioned view along line III—III of FIG. 2.
Figure 4:
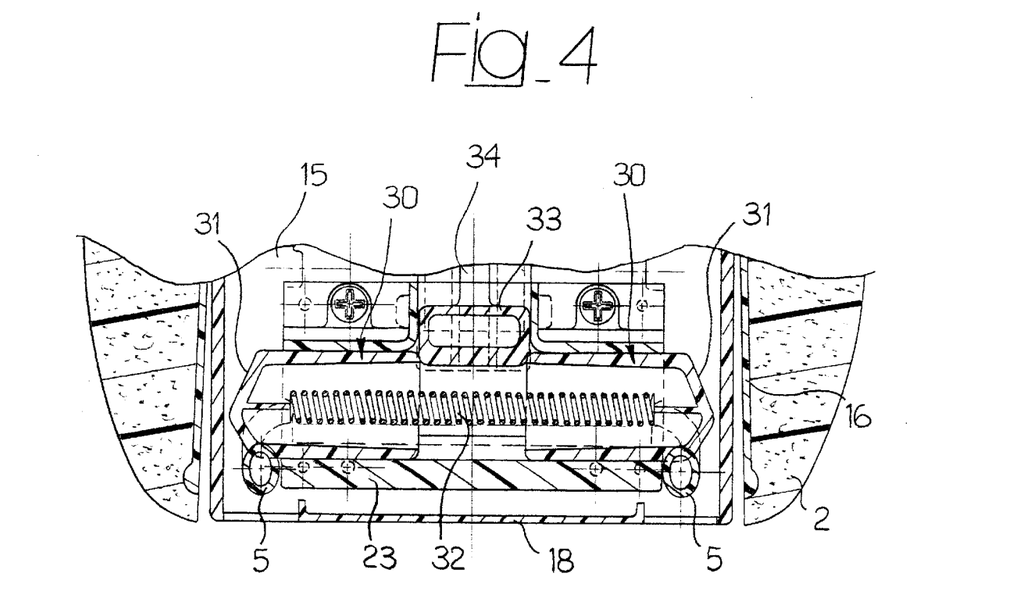
FIG. 4 is a sectioned view along line IV—IV of FIG. 2.
Figure 5:
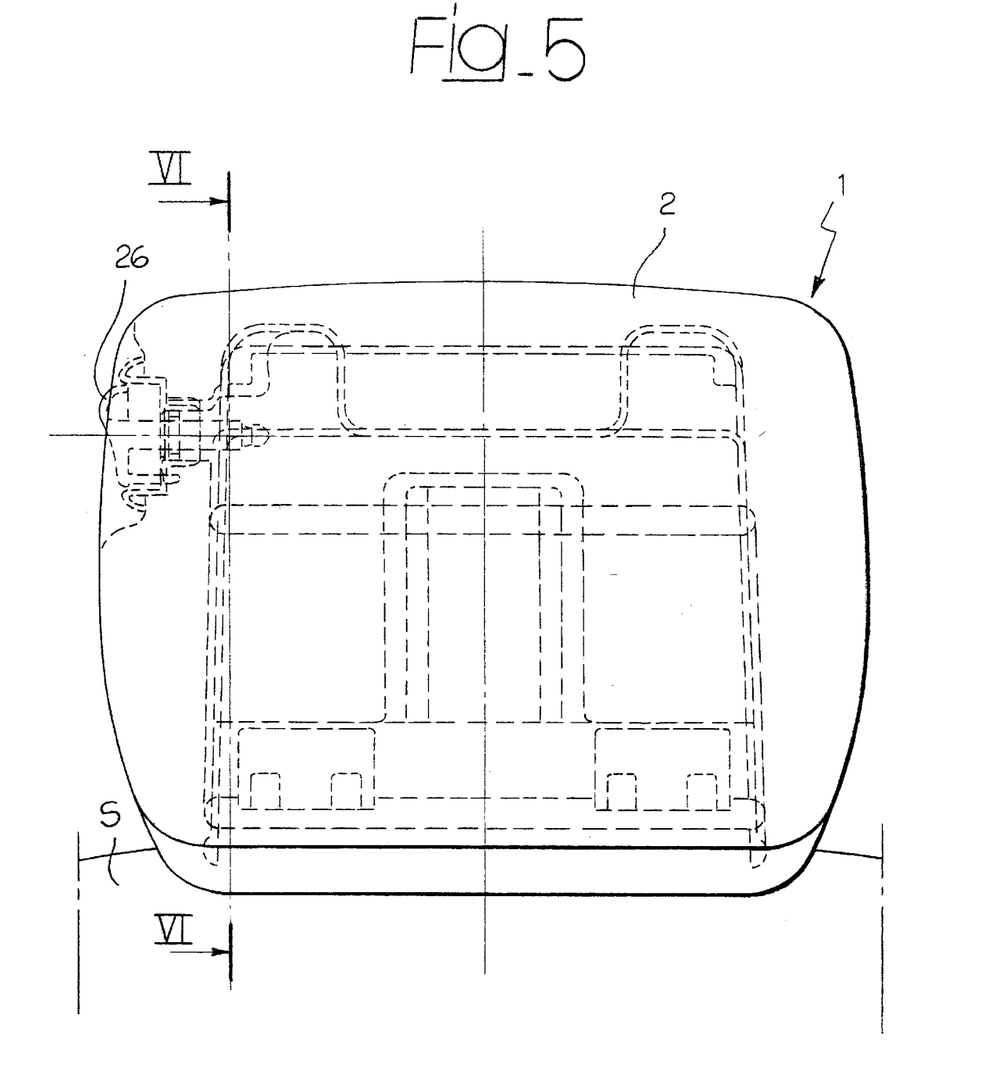
FIG. 5 is an elevational view same as FIG. 1 showing the headrest in the lowered position.

A slider member 25 is guided along the upper tubular element 24 and is slidable, transversely with respect to the swinging arms 5,6 and against of the action of a spring 27, between an inoperative rest position and an operative position, shown in FIG. 3. Displacement is controlled by means of a manually operated thrust push-button 26 arranged on one side of the yielding body 2.

The slider member 25 is formed with a recess 28 delimited by a ramp-like slanting wall 29, whose function will be clarified in the following.

The lower tubular element 23 houses therein a pair of juxtaposed locking blocks 30, normally made of self-lubricating plastic material, having a hollow construction and formed with respective substantially wedge-like outer ends 31. A strong helical compression spring 32 is interposed between the two locking blocks 30, urging these blocks 30 towards a mutually distal position in which the ends 31 thereof project outside of the lower tubular element 23, so as to interfere with the lower swinging arms 5 such as clarified in the following. The two locking blocks 30 can be displaced, such as also clarified herebelow, along a direction parallel to the displacement direction of the slider member 25, towards a mutually proximal position against the action of the spring 32, in which the respective ends 31 are partially or fully retracted within the tubular element 23.

Reference numeral 33 designates a central stop element carried by a profiled rod 34 extending between the slider member 25 and the locking blocks 30, perpendicularly thereto. The rod 34 is formed, at its end opposite to the stop element 33, with an annular part 35 passed through by the slider member 25 and arranged in correspondence of the recess 28 thereof. The annular part 35 has on one side thereof a rounded heel 36 facing towards the ramp-like slanting wall 29 of the slider member 25. As it will be clarified in the following, the ramp-like slanting wall 29 and the heel 36 define a control cam formation by means of which the stop member 33 can be displaced, owing to displacement of the slider member 25 from the inoperative condition of FIG. 3 to the operative condition of FIG. 7, from an advanced position shown in FIG. 4 to a retracted position shown with dotted lines in FIG. 8. In the advanced position the stop member 33 is interposed between the locking blocks 30, so as to irreversibly hold them in the previously disclosed distal position. Instead, in its retracted position the stop element 33 does not interfere with the locking blocks 30, which can thus be moved near to each other against the action of the thrust spring 32, i.e. can be retracted into the tubular element 23 so as to be brought to the above disclosed proximal position.

Reference numeral 37 designates a helical compression spring interposed between the upper tubular element 24 and a bearing surface of the rod 34 and acting so as to urge the stop member 33 towards its advanced position.

Reference numerals 38 designate two wire springs acting so as to rotate the yoke 14, and thus the two secondary arms 13 of the upper swinging arms 16, in anti-clockwise direction with reference to FIG. 2. It is to be pointed out that provision of these springs 38 is not strictly necessary.

Operation of the headrest 1 according to the invention will now be disclosed in the following.

In the raised position of the yielding body 2 shown in FIGS. 1 through 4 the lower swinging arms 5 and the upper swinging arms 6 are angularly located upwardly, with the secondary arms 13 extended beyond the upper swinging arms 6 and slightly misaligned relative thereto, having—as clarified in the above—gone through the dead center of the toggle mechanism formed by these arms 6 and 13, also with the aid of the wire springs 38. The slider member 25 is in its inoperative condition, the rod 34 with the stop element 33 is located in its advanced position, whereby the locking blocks 30 are held in their distal position, and the respective ends 31 thereof bear from above against the lowered swinging arms 5. In this condition the articulated parallelogram system 4 is locked: the lower swinging arms 5 cannot be rotated downwardly owing to the positive stop operated by the two locking blocks 30, and the yielding body 2 cannot thus be displaced towards its lowered position. Also a further upward rotation of the lower swinging arms 5 is prevented, owing to bearing thereof against the stop element 41 carried by the supports 7. Accordingly the yielding body 2 is locked in the raised position, and not even a force applied thereupon from above downwardly would be able to cause lowering thereof. Lowering can actually only be carried out following positive operation of the push-button 26, i.e. following displacement of the slider member 25 from the inoperative position of FIG. 3 to the operative position of FIG. 7, against the action of the spring 27. Owing to this displacement and to the interaction between the heel 36 of the rod 35 and the ramp 29 of the slider member 25, the stop element 33 is raised to its retracted position shown in FIG. 8. In this position the stop element 33 does not interfere any more with the locking blocks 30 whereby, by application of a force from above downwardly onto the yielding body 2, the related moment applied to the lower swinging arms 5 operates downward swinging thereof, with a consequent thrust applied thereby against the ends 31 of the locking blocks 30, which are thus retracted into the lower tubular element 23 towards their mutually proximal position, against the action of the spring 32.

Following this retraction, the lower swinging arms 5 are made free to fully rotate downwardly, thus bringing the yielding body 2 to its lowered position.

It is to be pointed out that, in consideration of the high elastic load of the spring 32 and of the peculiar design of the ends 31 of the locking blocks 30, the amount of the force which shall have to be applied onto the yielding body 2 from the above downwardly is correspondingly high.

Figure 6:
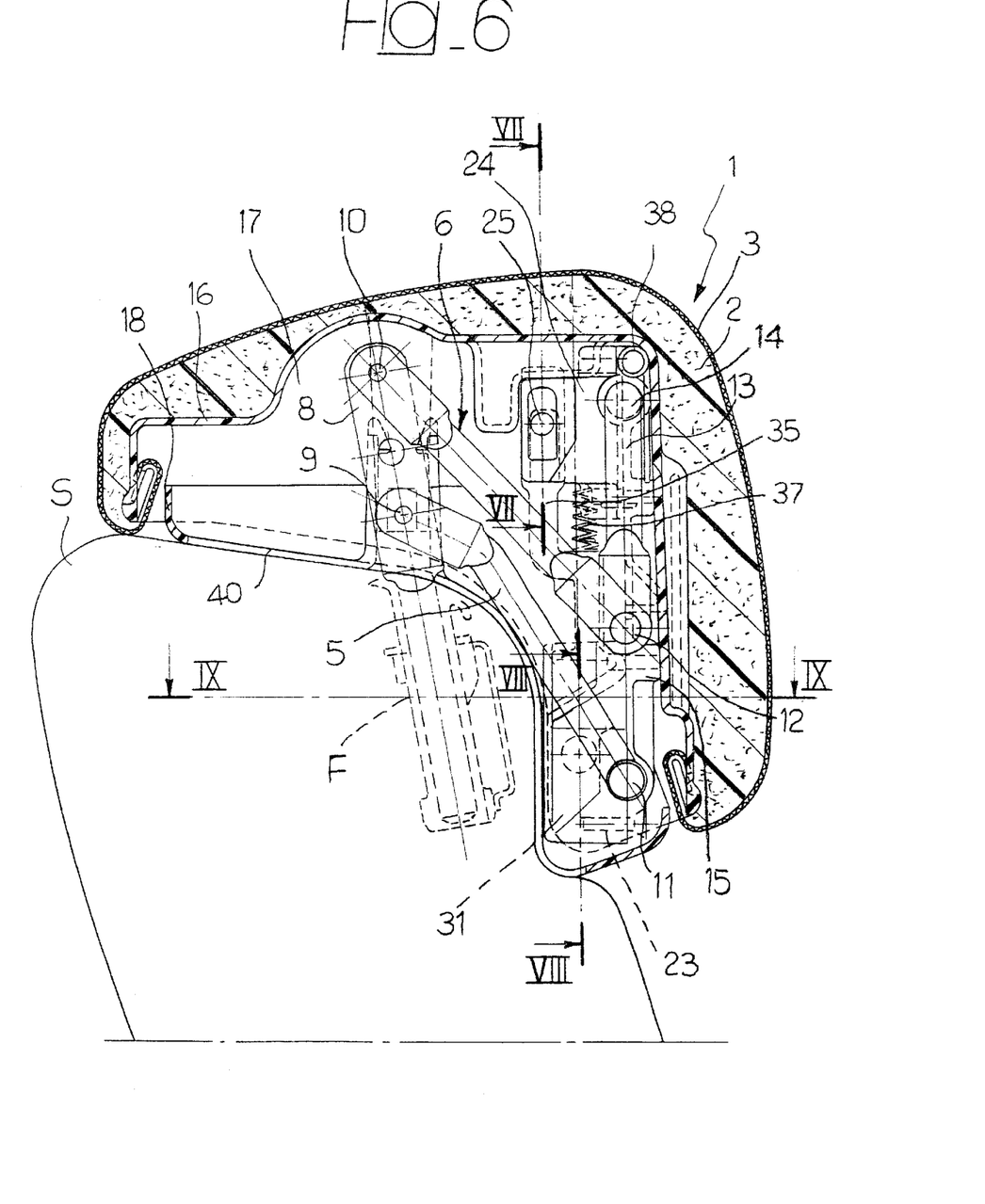
FIG. 6 is a vertically sectioned view along line VI—VI of FIG. 5.
Figure 7:
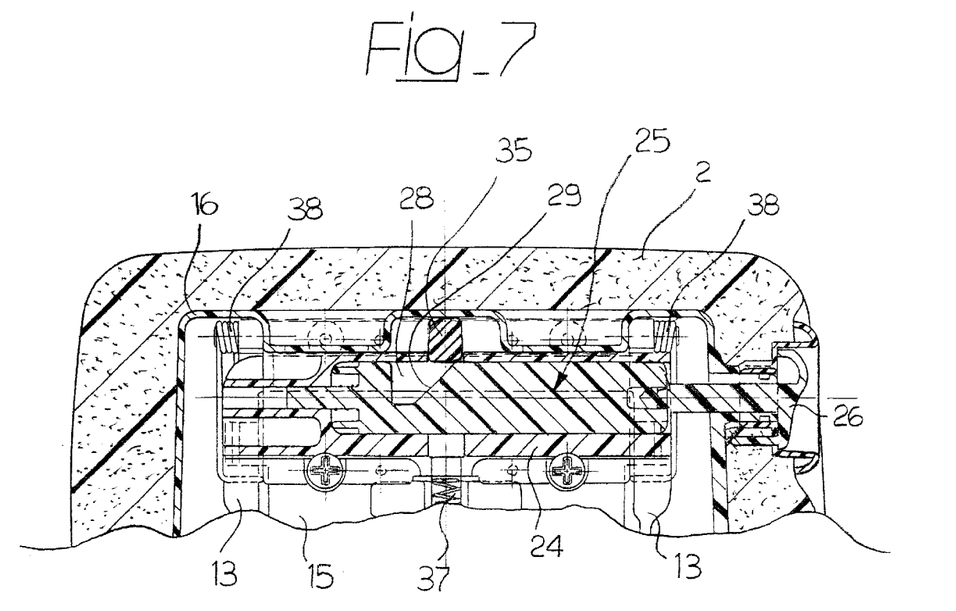
FIG. 7 is a sectioned view along line VII—VII of FIG. 6.
Figure 8:
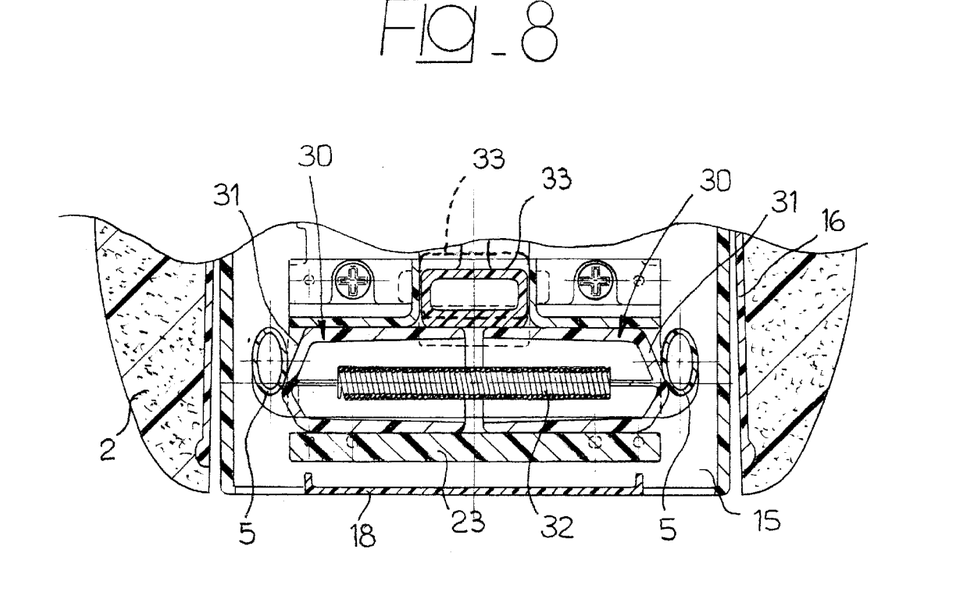
FIG. 8 is a sectioned view along line VII—VII of FIG. 6.

As shown in detail in FIG. 6, in the lowered condition of the yielding body 2, in which the cover 18 rests upon the top of the seat backrest S, the two pairs of swinging arms 5,6 are angularly placed downwardly and are substantially entirely housed, together with plates 8 of the supports 7, within the recess 17. The secondary arms 13 of the swinging arms 6 are in this condition oriented substantially vertically upwardly, and the locking blocks 30 are arranged in an intermediate condition between the mutually proximal position and the mutually distal position, i.e. slightly project—under the action of the spring 32—outside of the tubular element 23, with the respective ends 31 placed under the lower arms 5. In this position, when the push-button 26 is released so as to enable return of the slider member 25 to the inoperative position of FIG. 3, the consequent lowering of the rod 35 under the action of the spring 37 shall bring the stop element 33 to an intermediate position between the retracted and advanced positions, namely to the position shown with dotted lines in FIG. 8 in which the stop element 33 bears from above against the inner ends of the two locking blocks 30, without preventing displacement thereof towards the proximal position, i.e. without any positive lock.

Starting from this condition, to bring the yielding body again to the raised position it is sufficient to apply to this body 2 an upwardly displacing force, so as to rotate the articulated parallelogram system 4 upwardly. The force which shall have to be applied in this case appreciably lower than the force necessary to move the yielding body 2 from the raised position to the lowered position. Upward rotation of the lower arms 5 releases the locking blocks 30 which, under the action of the spring 32, move again to their distal position thus enabling, as a direct consequence, displacement of the stop element 33 towards the advanced position of FIG. 4, under the action of the spring 37.

It will be apparent from the above that the headrest according to the invention ensures maximum positioning and stability safety both in the raised position, in which the headrest is rigidly and irreversibly locked, and in its lowered position, and also that displacement thereof from the raised position to the lower position requires the combined action of a positive unlocking operation of a manually operated release member (the push-button 26) and of application onto the yielding body 2 of a strong downward force.

Naturally, the details of construction and the embodiments may be widely varied with respect to what has been disclosed and illustrated, without thereby departing from the scope of the present invention such as defined in the appended claims.

What is claimed is:

1. Headrest for motor-vehicle seats, comprising:

a) a yielding body;

b) a support structure to connect said yielding body to a backrest of a motor-vehicle seat;

c) said support structure comprising a lower pair arms having respective one ends pivotally attached to said yielding body and respective other ends pivotally attached to a pair of supports to be fixed to a seat backrest, and an upper pair of arms having respective one ends pivotally attached to said pair of supports and respective other ends pivotally connected to said yielding body;

d) said upper pair of arms being articulated to provide a variable length when said yielding body is displaced between said lowered and raised position to thereby displace said yielding body forwardly and angularly when in said raised position, said variable length being the distance between the pivotal connection at said pair of supports and the pivotal connection at said yielding body of said upper pair of arms; and d) a releasable locking mechanism to hold said yielding body in said raised position or in said lowered position.

2. Headrest as in claim 1, wherein:
a) said locking mechanism acts on one of said lower and upper pairs of arms to define a toggle mechanism whose dead center is gone through in said raised position.

3. Headrest as in claim 2, and further comprising:
a) two supports adapted to be fixed to a seat backrest;
b) an attachment structure connected to said yielding body;
c) first pivot pins pivotally connecting one end of said upper and lower pairs of arms and said pair of supports;
d) second pivot pins between the other ends of said upper and lower pairs of arms and said attachment structure;
e) said second pivot pins being formed by connecting yokes of said arms rotatably supported by said attachment structure; and
f) said pair of supports being provided with respective stop elements for said lower pair of arms in said raised position of said yielding body.

4. Headrest as in claim 3, and further comprising a pair of secondary arms pivotally connecting said upper pair of arms with the respective connecting yoke to define said toggle mechanism.

5. Headrest as in claim 4, and further comprising a spring acting so as to mutually misalign said pair of secondary arms and said upper pair of arms in said raised position of said yielding body.

6. Headrest as in claim 5, wherein said attachment structure comprises:
a) a half-shell member secured to said yielding body and defining a load-bearing framework of said headrest;
b) a mounting plate carrying said articulated parallelogram system and said locking mechanism; and
c) irreversible snap-fit coupling between said mounting plate and said half-shell.

7. Headrest as in claim 6, wherein:
a) said yielding body has a shape adapted to complement a top of said backrest;
b) said yielding body in said lowered position rests upon the top; and
c) said half-shell member delimits a rear recess of said yielding body which in said lowered position of said yielding body fully houses said articulated parallelogram system.

8. Headrest as in claim 1, wherein said locking mechanism comprises:
a) a slider member displaceable transversely of said arms between an inoperative and an operative condition;
b) a pair of juxtaposed locking blocks movable parallel to said slider member between a mutually distal position and a mutually proximal position wherein said blocking blocks interact and do not interact, respectively, with said lower pairs of arms;
c) a spring urging said locking blocks towards said distal position; and
d) a stop element movable perpendicularly to said slider member and to said locking blocks and displaceable, following displacement of said slider member from said inoperative condition to said operative condition, from an advanced position in which said stop element is interposed between said blocking blocks to irreversibly keep them in said distal position, and a retracted position in which said locking blocks can be brought to said proximal position against the action of said spring upon putting said yielding body in said lowered position.

9. Headrest as in claim 8, and further comprising:
a) a first spring to urge said slider member to said inoperative condition; and
b) a second spring to urge said stop element towards said advanced position.

10. Headrest as in claim 9, wherein said slider member includes a slanting wall operative to move said stop element to said retracted position when said slider is moved to said operative condition.

11. Headrest as in claim 9, and further comprising a manually operable release mechanism to displace said slider member from said inoperative condition to said operative condition against the action of said first spring.

12. Headrest as in claim 11, wherein said release mechanism comprises a push-button arranged on one side of said yielding body.

13. Headrest as in claim 1, wherein said locking mechanism is adapted to provide in said raised position of said yielding body a retaining force appreciably higher than that of said lowered position.

14. Headrest for motor-vehicle seats, comprising:
a) a yielding body;
b) a lower pair of arms having respective one ends pivotally attached to said yielding body and respective other ends pivotally attached to a pair of supports to be fixed to a seat backrest;
c) an upper pair of arms having respective one ends pivotally attached to said pair of supports;
d) a secondary pair of arms having respective one ends pivotally attached to respective other ends of said pair of upper arms, said secondary pair of arms having respective other ends pivotally connected to said yielding body;
e) said lower, upper and secondary pairs of arms forming an articulated parallelogram support structure to displace said yielding body between a lowered position and a raised position;
f) said secondary pair of arms being bent toward said upper pair of arms when said yielding body is in said lowered position; and
g) said upper and secondary pairs of arms being extended out to a length greater than the length of said lower pair of arms when said yielding body is in said raised position, thereby to tilt and advance forward said yielding body relative to said lowered position.

15. Headrest as in claim 14, wherein said pair of supports include respective stop elements for said lower pair of arms in said raised position of said yielding body.

16. Headrest as in claim 14, and further comprising a spring acting so as to mutually misalign said pair of secondary arms and said upper pair of arms in said raised position of said yielding body.

17. Headrest as in claim 14, and further comprising:
a) an attachment structure connected to said yielding body; and
b) said lower and secondary pairs of arms including respective connecting yokes rotatably supported by said attachment structure.

18. Headrest as in claim 17, wherein said attachment structure comprises:
a) a half-shell member secured to said yielding body and defining a load-bearing framework of said headrest;
b) a mounting plate carrying said articulated parallelogram system and said locking mechanism; and
c) irreversible snap-fit coupling between said mounting plate and said half-shell.

19. Headrest as in claim 14, wherein:
a) said yielding body has a shape adapted to complement a top of said backrest;
b) said yielding body in said lowered position rests upon the top; and
c) said half-shell member delimits a rear recess of said yielding body which in said lowered position of said yielding body fully houses said articulated parallelogram system.

20. Headrest for motor-vehicle seats, comprising:
a) a yielding body;
b) a support structure to connect said yielding body to a backrest of a motor-vehicle seat, said support structure comprising a lower pair and an upper pair of arms to displace said yielding body between a lowered position and a raised position;
c) releasable locking mechanism to hold said yielding body in said raised position or in said lowered position;
d) said locking mechanism comprising a slider member displaceable transversely of said arms between an inoperative and an operative condition, a pair of juxtaposed locking blocks movable parallel to said slider member between a mutually distal position and a mutually proximal position wherein said blocking blocks interact and do not interact, respectively, with said lower pairs of arms;
e) a spring urging said locking blocks towards said distal position; and
f) a stop element movable perpendicularly to said slider member and to said locking blocks and displaceable, following displacement of said slider member from said inoperative condition to said operative condition, from an advanced position in which said stop element is interposed between said blocking blocks to irreversibly keep them in said distal position, and a retracted position in which said locking blocks can be brought to said proximal position against the action of said spring upon putting said yielding body in said lowered position.

21. Headrest as in claim 20, and further comprising:
a) a first spring to urge said slider member to said inoperative condition; and
b) a second spring to urge said stop element towards said advanced position.

22. Headrest as in claim 20, wherein said slider member includes a slanting wall operative to move said stop element to said retracted position when said slider is moved to said operative condition.

23. Headrest as in claim 20, and further comprising a manually operable release mechanism to displace said slider member from said inoperative condition to said operative condition against the action of said first spring.

24. Headrest as in claim 23, wherein said release mechanism comprises a push-button arranged on one side of said yielding body.

* * * * *